Figure 3:
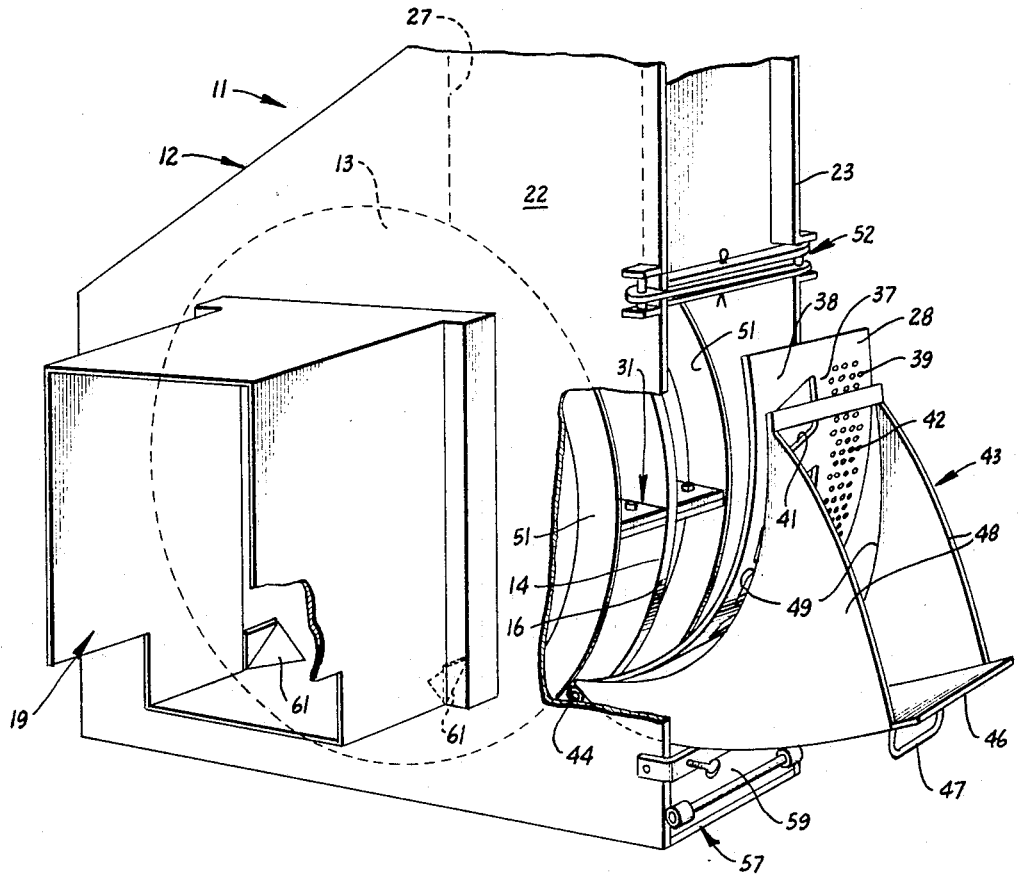

Sept. 27, 1966  E. D. THOMPSON ETAL  3,275,251
DUAL FEED MILL
Filed Feb. 3, 1964  2 Sheets-Sheet 1
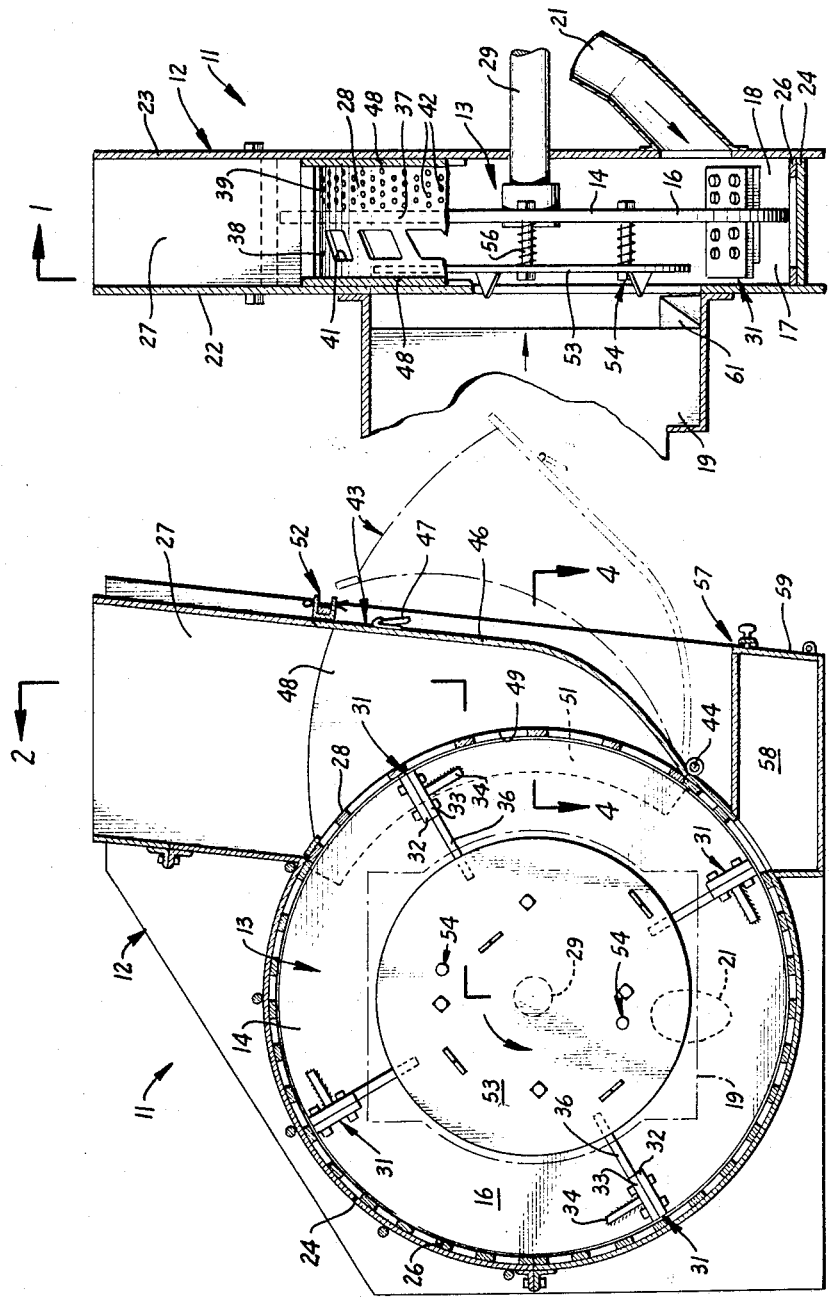
INVENTORS
EUGENE D. THOMPSON
JOSEPH E. WHITT
BY
Schapp & Hatch
ATTORNEYS Sept. 27, 1966    E. D. THOMPSON ETAL    3,275,251
DUAL FEED MILL Filed Feb. 3, 1964    2 Sheets-Sheet 2

INVENTORS
EUGENE D. THOMPSON
BY JOSEPH E. WHITT
Schapp & Hatch
ATTORNEYS ns # United States Patent Office 3,275,251
Patented Sept. 27, 1966

3,275,251
DUAL FEED MILL
Eugene D. Thompson, Rte. 7, Box 612, and Joseph E. Whitt, 3013 Shenandoah Way, both of Modesto, Calif.
Filed Feb. 3, 1964, Ser. No. 342,101
12 Claims. (Cl. 241—44)

The present invention relates to improvements in a rotary feed mill, and particularly to a rotary feed mill capable of comminuting different types of materials.

Rotary feed mills are well-known which are capable of grinding or pulverizing agricultural products such as hay, straw, grain products, cotton seed cake, and the like in order to formulate feed. Such mills are well-known and typical examples are shown in United States Patent 2,248,640 to Ervin T. Miller and United States Patent 2,128,727 to Claire T. Elderkin. In addition to these basic forms, improved forms of mills of this type have been developed which include accessory structures, and it will be appreciated that the present invention may also include such improved accessories or other structures.

In the formulation of feed materials, several components are usually pulverized and blended together and the blend thoroughly mixed and pelletized to provide carefully formulated diet material for feeding to domestic animals. For example, certain special formulations are desirable for feeding hens which are laying eggs and other formulations are desirable for milk cows. Accordingly, the diets may be regulated and the feed material be pelletized, if desired, to provide excellent diets and increase the productivity of the particular livestock being so fed.

In a usual procedure, the various components are comminuted to the extent desired and then blended in a suitable mixer. However, it is possible in some cases to provide several components in the feed end of the mill or pulverizer and thereby obtain a ground and thoroughly mixed material. However, some components require a different amount of pulverizing or milling than other components, and in such a case, it is not possible to grind all of the constituents together in the conventional mill.

It is, therefore, a primary object of the present invention to provide a feed mill capable of achieving two different grinding programs simultaneously so as to grind and mix materials ground according to two separate grinding programs simultaneously in the same mill.

Another object of the invention is to provide a rotary feed mill of the character described in which the pulverizing means are easily converted from one system to another in order to obtain various combinations of degrees of grinding.

A further object of the invention is to provide a rotary feed mill of the character described in which two milling operations are carried out in side by side fashion with a single rotor and the ground products are discharged pneumatically through a common duct where intimate mixing of the materials ground in both sections is effected.

Still another object of the invention is the provision of a rotary feed mill of the character described which is capable of receiving baled hay or the like in one section and receiving grain or the like in another section and simultaneously grinding both materials and discharging them through a common outlet so as to provide an intimately mixed product of two different materials ground under two different grinding programs.

A still further object of the invention is the provision of a rotary feed mill of the character described capable of performing two grinding programs in a comparatively simple compact unit which is inexpensive to construct and thoroughly reliable in operation.

Further objects and advantages of this invention will be apparent as the specification progresses, and the new and useful features of the rotary feed mill will be fully defined in the claims attached hereto.

Figure 4:
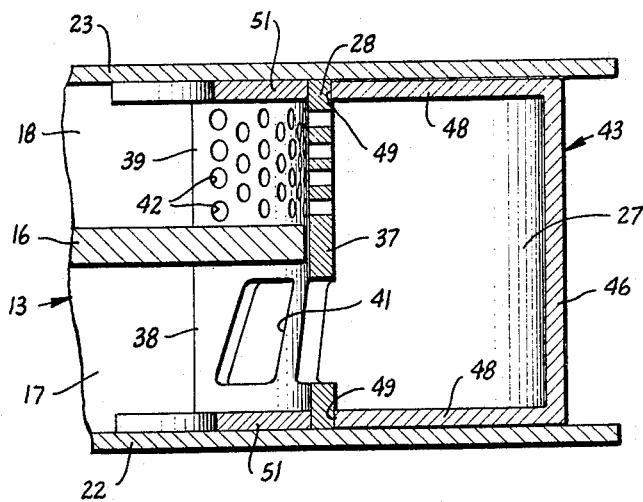

The preferred form of the invention is illustrated in the accompanying drawings, forming a part of this description, in which:

FIGURE 1 is a cross-sectional elevational view of a typical feed mill constructed according to the invention substantially as seen in the plane of line 1—1 of FIGURE 2;

FIGURE 2, a cross-sectional side elevational view of the same mill taken substantially in the plane of line 2—2 of FIGURE 1;

FIGURE 3, a perspective view of the feed mill shown in FIGURES 1 and 2 with parts broken away in order to illustrate more clearly certain of the internal parts, and shown with the access door open to illustrate certain of the novel structures of this invention; and FIGURE 4, an enlarged cross-sectional view of the mill of FIGURES 1 through 3 taken substantially in the plane of line 4—4 of FIGURE 1.

While only the preferred form of the invention is shown, it should be understood that various changes or modifications may be made within the scope of the claims attached hereto without departing from the spirit of the invention.

Referring to the drawings in greater detail, there is shown a feed mill 11 comprising a housing 12 having a drum-like inner chamber 13 in which a rotor 14 is mounted. A partition member 16 is provided on the rotor so as to divide the chamber within the housing into two compartments 17 and 18 and duct means 19 and 21 are provided for supplying feed materials into the compartment 17 and 18 respectively.

The housing 12 contains a front wall 22 and a rear wall 23 which are substantially flat plate-like members that enclose an outer casing 24 and a lining 26. The outer casing is constructed to house the unit and contains walls defining an outlet duct 27 which is in communication with the chamber 13 and partially separated therefrom by a screen 28.

In general, the outer casing may be any suitable configuration and the screen 28 may be placed at any convenient place along the periphery of the chamber 13. Thus the screen may be located at a said wall position as shown here to provide an asymmetric mill or it may be placed at the top with the outlet duct 27 extending through the top to produce a symmetric form. The asymmetric form is preferred for the dual mill of the character described herein, because of simpler design which provides access to the screen. This access is important, because it allows the screen to be removed and changed with a different screen. However, it will be appreciated that access may be provided to a symmetric type mill if desired, and that in its broad form the present invention embraces both designs.

The chamber 13 is in the shape of a shortened cylinder or drum having its lining in the shape of a circular cylinder which is terminated by parallel walls 22 and 23 of the housing with each wall substantially perpendicular to the axis of the cylinder. In addition, the screen is in the shape of a section of a circular cylindric surface and matches with the lining and serves as a portion thereof so that both the screen and the lining form a complete cylindric surface. However, the screen contains two groups of openings which lead from the chamber 13 into the outlet duct 27 and these openings serve the double function of cooperating with the rotor to pulverize feed material and allowing egress of comminuted materials from the mill.

The rotor 14 is mounted on a shaft 29 which is held in suitable bearings for supporting the rotor and driven by conventional power means (not shown )in a manner similar to that described in the above cited patents. A rotor contains the partition member 16 as a main body thereof with beater paddles 31 on the periphery of the rotor in juxtaposed position to the liner and screen. As here shown, four beater paddles are provided in symmetrical locations, but it will be appreciated that more or less paddles can be provided if desired. The beater paddles are located on both sides of the partition member 16 so that in effect, two separate sets of beater paddles are contained in each of the two compartments in similar fashion. Thus, the dual mill is similar in function to two mills, yet it has one rotor and a common outlet duct so that simultaneous pulverizing and mixing takes place.

As here shown, the beater paddles 31 each comprises a flat plate like member 32 bolted to a flange 33 which in turn is welded to the partition member 16 and held securely in perpendicular planar relation thereto by brace member 34 which is welded to both the flange and the partition. Beater paddle extensions 36 are also provided to increase the area of the plates. In this way, the plate members may be located where desired and bolted in accurate close proximity to the screen member.

These beater paddles not only serve to cooperate with the openings in the screen to achieve comminuting, but also serve as a centrifugal fan to draw air in through the inlet and send air out through the screen and outlet duct 27. For this reason, the beater paddle extensions are important in assisting in this centrifugal fan type operation and in causing the material fed into the mill to seek one or another of the quadrants defined by the beater paddles.

As indicated above, the screen member contains holes for cooperating with the beater paddles and grinding feed material as well as providing egress for comminuted material from the chamber 13. However, an important feature of this invention is the provision of a screen having two separate sections in side by side relation containing holes which cooperate with the beater paddles of each different compartment. The screen 28 also usually contains a strip 37 which fits adjacent to the partition member 16 and has no holes in it at all.

On each side of the separator strip 37, there is a separate section of holes or openings which act in cooperation with the beater paddles of each compartment. Thus there is a screen section 38 on one side of the strip 37 which is in communication with the compartment 17 of chamber 13, and a screen section 39 which is on the other side of strip 37 and in communication with compartment 18 of chamber 13. As best seen in FIGURES 2 and 3, the screen section 38 contains rather large openings 41 which are constructed to present angular cutting faces and chop stalk-like material. It is known that this type of opening achieves excellent results when cutting hay or like materials. On the other hand, the screen section 39 contains holes 42 which are much smaller than the holes 41 and generally circular in cross-section. These holes 42 are especially suitable for grinding grains by the combined action of beater paddles 31 and the openings.

In this way, it is seen that two different comminuting operations take place in side by side relation, and that the resulting ground materials are carried pneumatically to a common duct where intimate mixing takes place. Accordingly, it is possible to achieve a grinding and mixing operation in one step where two different types of grinding take place.

In this connection, it is often desirable to change one or both sections of the screen to provide different types or sizes of holes for different grinding programs. Accordingly, it is an important feature of this invention to provide a removable screen and access means to the screen as well as holding means for keeping it securely in place. As best seen in FIGURES 3 and 4, these access means comprise a door 43 which is constructed to provide a beginning section of the exhaust duct and is in the shape of a curved wedge open at the top and at one side where it is adapted to cooperate with the curved screen, and pivoted to the housing at its apex by suitable pivotal connecting means such as pivot pin 44. The door 43 thus contains a front panel 46 having a handle 47 thereon and two wedge shaped side walls 48 having curved backs 49 adapted to abut the sides of the screen and force the screen against curved members 51 which are fastened to walls 22 and 23 of the housing. In this way, the screen 28 is clamped between the door 43 and the members 51 so as to be securely held when the door is held in closed position by latch mechanism 52 (see FIGURE 1).

The screens are generally constructed of similar dimensions so as to fit exactly into the open section of the linings which hold them against rotational movement, and to fit properly between the curved back 49 of the door and the curved members 51 provided within the drum. Any number of screens may be provided depending upon the particular type of grinding program to be achieved. By using replaceable screens, it is not only possible to provide additional programs for dual pulverizing according to the invention, but is also possible to provide different screens so as to provide optimum pulverizing conditions for different types of hay. Thus, the interchangeable screen is another independent and important feature of the present invention.

As indicated above, the feed mill may contain various other devices which have been found to be valuable in this type of feed mill. For example, the rotor also contains a bale buster plate 53 containing means 54 for breaking up bales and resiliently mounted by adjustable resilient mounting means 56. This bale buster plate is described and claimed in the United States Patent No. 3,035,621 to H. L. Burcham, issued May 22, 1962. Alternatively, other bale busting structures may be used if desired. Another accessory unit that may be provided is the tramp iron collector 57 which contains a chamber 58 having a door 59 operating as described in other patents and applications known in the art. In addition, other possible improvements not here shown may be incorporated, if desired.

As here shown, the dual feed mill is particularly important when materials such as hay are to be ground and combined with materials such as grain which is also to be ground. In this connection, the bales of hay or the like are fed to the machine through the duct means 19 which is constructed of a size sufficient to pass a whole bale into the machine while the grain is provided through duct means 21 which is generally smaller and provides a smaller opening in the chamber in which the grain is ground. Frequently when bales of hay or like material are added, they tend to become moist or wet on the bottom, particularly at the corners. These corners, therefore, tend to form clumps which slow down the operation of the mill unless means are provided for breaking the clumps up. Accordingly, the embodiment of the present invention also shows wedge-shaped means 61 in the lower corners of the duct means 19. These wedge-shaped means are generally angular wedges of metal that are welded to the duct at the opening into the mill and provide slight projections into the duct passage that tend to break up the hay at the corners and thus break clumps located in those areas.

In operation of the mill, the screen is selected which is desired to grind the particular grain formula and hay formula to be added to the mill. This screen will either already be in place on the mill from previous operations or will be inserted therein by opening the latch mechanism 52, swinging the door 43 outward on its pivot and removing the screen 28 already in the mill as best seen in FIGURE 3. A new screen is then placed in position and the door swung back in place and latched to hold the screen firmly between the curved back 49 of the door and the curved members 51 in the housing of the mill.

With the proper screen in place, power is applied to the rotor so as to bring the rotor up to operating speed. The hay material is then fed in through chute 19 and the grain is added through chute 21 in the proper relative proportions so that the ground material will be mixed in the desired proportions in the outlet duct 27, as it is carried out pneumatically therefrom. The ground materials are then separated from the air in the usual manner and pelletized or otherwise processed in accordance with the desired program for producing the feed required.

Although this duel mill has been designed and developed specifically for combined grinding and mixing of more than one type of material under more than one type of grinding program, it will be appreciated that the mill could also be utilized to grind either one of the two materials in either one of the compartments while leaving the other compartment in an inactive state. It will also be appreciated, that the mill of this invention in eminently suitable for changing screens and providing different types of grinding programs in a single mill with the changes being effected quickly and efficiently and in no way interfering with the ability of the mill to achieve its desired function.

We claim:

1. A feed mill comprising a housing enclosing a chamber in which materials to be ground are held, a screen in the shape of a section of a circular cylindric surface serving as a wall of said chamber, a rotor mounted for rotation in said housing on an axis substantially in common with the axis of the cylindric surface of the screen and having cutting means acting in cooperation with the screen for pulverizing feed materials, a partioned member on the rotor dividing the chamber of the housing into two compartments, and duct means for supplying feed material into each of the two compartments to effect grinding of the feed materials.

2. A feed mill comprising a housing enclosing a chamber in which materials to be ground are held, a screen in the shape of a section of a circular cylindric surface serving as a wall of said chamber, a rotor mounted for rotation in said housing on an axis substantially in common with the axis of the cylindric surface of the screen and having cutting means acting in cooperation with the screen for pulverizing feed materials, a partition member on the rotor dividing the chamber of the housing into two compartments and dividing the cutting means so as to provide cutting means in both compartments, said screen having a first group of sized openings acting in cooperation with the cutting means of one of said compartments and a second group of sized openings acting in cooperation with the cutting means in the other compartment, and duct means for supplying feed material into each of the two compartments to effect grinding of the feed materials.

3. A feed mill comprising a housing enclosing a chamber in which materials to be ground are held, a screen in the shape of a section of a circular cylindric surface serving as a wall of said chamber, a rotor mounted for rotation in said housing on an axis substantially in common with the axis of the cylindric surface of the screen and having cutting means acting in cooperation with the screen for pulverizing feed materials, a partition member on the rotor dividing the chamber of the housing into two compartments and dividing the cutting means so as to provide cutting means in both compartments, said screen having a first group of sized openings acting in cooperation with the cutting means of one of said compartments and a second group of sized openings acting in cooperation with the cutting means in the other compartment, an exhaust duct in said housing in communication with both groups of sized openings in the screen, a door in said housing located to provide access to said screen, and duct means for supplying feed material into each of the two compartments to effect grinding of the feed materials.

4. The feed mill defined in claim 3, in which the door in the housing includes the section of the exhaust duct adjacent to the screen and cooperates with the screen to form a duct section in the shape of a curved wedge open at the top and having the curved screen serve as one wall thereof, said door being pivotal to the housing at the pointed end therof and holding the screen between the side walls of the door against stop means in the chamber to provide access for removing and changing the screen elements.

5. A dual feed mill capable of grinding two separate types of feed material according to two different grinding programs and providing an intimate mixture of the ground product comprising, a housing enclosing a chamber in which materials to be ground are held, a rotor mounted for rotation in said housing, a plurality of beater paddles on said rotor adjacent to the inner periphery of said housing to provide a propelling action and a cutting action on the material to be pulverized in the mill, a substantially circular plate member on the rotor dividing the chamber into two compartments each containing a section of said beater paddles, a screen in the shape of a cylindric surface adapted to fit in the housing adjacent to the beater paddles to cooperate therewith and comminute materials and for passing ground materials therethrough, duct means in the housing in communication with said screen for mixing materials ground according to different programs and removing the mixed material from the feed mill, and duct means for supplying feed material into each of the two compartments to effect grinding of the feed materials.

6. A dual feed mill capable of grinding two separate types of feed material according to two different grinding programs and providing an intimate mixture of the ground product comprising, a housing enclosing a chamber in which materials to be ground are held, a rotor mounted for rotation in said housing, a plurality of beater paddles on said rotor adjacent to the inner periphery of said housing to provide a propelling action and a cutting action on the material to be pulverized in the mill, a substantially circular plate member on the rotor dividing the chamber into two compartments each containing a section of said beater paddles, a screen in the shape of a cylindric surface adapted to fit in the housing adjacent to the beater paddles to cooperate therewith and comminute materials and for passing ground materials therethrough, said screen having a first group of sized openings acting in cooperation with the cutting means of one of said compartments and a second group of sized openings acting in cooperation with the cutting means in the other compartment, an exhaust duct in said housing in communication with both groups of sized openings in the screen, and duct means for supplying feed material into each of the two compartments to effect grinding of the feed materials.

7. A dual feed mill capable of grinding two separate types of feed material according to two different grinding programs and providing an intimate mixture of the ground product comprising, a housing enclosing a chamber in which materials to be ground are held, a rotor mounted for rotation in said housing, a plurality of beater paddles on said rotor adjacent to the inner periphery of said housing to provide a propelling action and a cutting action on the material to be pulverized in the mill, a substantially circular plate member on the rotor dividing the chamber into two compartments each containing a section of said beater paddles, a screen in the shape of a cylindric surface adapted to fit in the housing adjacent to the beater paddles to cooperate therewith and comminute materials and for passing ground materials therethrough, said screen having a first group of sized openings acting in cooperation with the cutting means one of said compartments and a second group of sized openings acting in cooperation with the cutting means in the other compartment, an exhaust duct in said housing in communication with both groups of sized openings in the screen, a door in said housing located to provide access to said screen, said door being pivotal to the housing at the pointed end thereof and holding the screen between the side walls of the door against stop means in the chamber to provide access for removing and changing the screen elements, and duct means for supplying feed material into each of the two compartments to effect grinding of the feed materials.

8. A feed mill comprising a housing enclosing a chamber in which materials to be ground are held, a screen in the shape of a section of a circular cylindric surface serving as a wall of said chamber, a rotor mounted for rotation in said housing on an axis substantially in common with the axis of the cylindric surface of the screen and having cutting means acting in cooperation with the screen for pulverizing feed materials, a partitioned member on the rotor dividing the chamber of the housing into two compartments, bale duct means opening into one of said compartments having a size sufficient to pass a bale of hay therethrough, and a grain chute opening into the other of said compartments.

9. A feed mill comprising a housing enclosing a chamber in which materials to be ground are held, a screen in the shape of a section of a circular cylindric surface serving as a wall of said chamber, a rotor mounted for rotation in said housing on an axis substantially in common with the axis of the cylindric surface of the screen and having cutting means acting in cooperation with the screen for pulverizing feed materials, a partitioned member on the rotor dividing the chamber of the housing into two compartments, bale duct means opening into one of said compartments having a size sufficient to pass a bale of hay therethrough, wedge shaped metal catch means in the lower corners of said bale duct means, and a grain chute opening into the other of said compartments.

10. A dual feed mill capable of grinding two separate types of feed material according to two different grinding programs and providing an intimate mixture of the ground product comprising, a housing enclosing a chamber in which materials to be ground are held, a rotor mounted for rotation in said housing, a plurality of beater paddles on said rotor adjacent to the inner periphery of said housing to provide a propelling action and a cutting action on the material to be pulverized in the mill, a substantially circular plate member on the rotor dividing the chamber into two compartments each containing a section of said beater paddles, a screen in the shape of a cylindric surface adapted to fit in the housing adjacent to the beater paddles to cooperate therewith and comminute materials and for passing ground materials therethrough, bale duct means opening into one of said compartments having a size sufficient to pass a bale of hay therethrough, and a grain chute opening into the other of said compartments.

11. A dual feed mill capable of grinding two separate types of feed material according to two different grinding programs and providing an intimate mixture of the ground product comprising a housing enclosing a chamber in which materials to be ground are held, a rotor mounted for rotation in said housing, a plurality of beater paddles on said rotor adjacent to the inner periphery of said housing to provide a propelling action and a cutting action on the material to be pulverized in the mill, a substantially circular plate member on the rotor dividing the chamber into two compartments each containing a section of said beater paddles, a screen in the shape of a cylindric surface adapted to fit in the housing adjacent to the beater paddles to cooperate therewith and comminute materials and for passing ground material therethrough, said screen having a first group of sized openings acting in cooperation with the cutting means of one of said compartments and a second group of sized openings acting in cooperation with the cutting means in the other compartment, an exhaust duct in said housing in communication with both groups of sized openings in the screen, bale duct means opening into one of said compartments having a size sufficient to pass a bale of hay therethrough, and a grain chute opening into the other of said compartments.

12. A dual feed mill capable of grinding two separate types of feed material according to two different grinding programs and providing an intimate mixture of the ground product comprising, a housing enclosing a chamber in which materials to be ground are held, a rotor mounted for rotation in said housing, a plurality of beater paddles on said rotor adjacent to the inner periphery of said housing to provide a propelling action and a cutting action on the material to be pulverized in the mill, a substantially circular plate member on the rotor dividing the chamber into two compartments each containing a section of said beater paddles, a screen in the shape of a cylindric surface adapted to fit in the housing adjacent to the beater paddles to cooperate therewith and comminute materials and for passing ground materials therethrough, said screen having a first group of side openings acting in cooperation with the cutting means one of said compartments and a second group of sized openings acting in cooperation with the cutting means in the other compartment, an exhaust duct in said housing in communication with both groups of sized openings in the screen, a door in said housing located to provide access to said screen, said door being pivotal to the housing at the pointed end thereof and holding the screen between the side walls of the door against stop means in the chamber to provide access for removing and changing the screen elements, bale duct means opening into one of said compartments having a size sufficient to pass a bale of hay therethrough, wedge shaped metal catch means in the lower corners of said bale duct means, and a grain chute opening into the other of said compartments.

References Cited by the Examiner
UNITED STATES PATENTS

| | | | |
|---|---|---|---|
| 2,026,426 | 12/1935 | Matejcik | 241—51 |
| 2,862,668 | 12/1958 | Stohsner | 241—138 |
| 3,035,621 | 5/1962 | Burcham | 241—56 |

ROBERT C. RIORDON, *Primary Examiner.*

DONALD KELLY, *Examiner.*